United States Patent
Lambert

(10) Patent No.: US 7,465,409 B2
(45) Date of Patent: Dec. 16, 2008

(54) HARD MAGNETIC CORE PARTICLES AND A METHOD OF MAKING SAME

(75) Inventor: Patrick M. Lambert, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 450 days.

(21) Appl. No.: 11/232,275

(22) Filed: Sep. 21, 2005

(65) Prior Publication Data

US 2006/0088781 A1    Apr. 27, 2006

(51) Int. Cl.
  *H01F 1/00* (2006.01)
  *G03G 9/107* (2006.01)
(52) U.S. Cl. .................... 252/62.63; 430/111.31
(58) Field of Classification Search ............ 430/111.31; 252/62.63
See application file for complete search history.

(56) References Cited

U.S. PATENT DOCUMENTS

| 3,716,630 A | 2/1973 | Shirk |
| 4,623,603 A | 11/1986 | Iimura et al. |
| 5,332,645 A | 7/1994 | Saha et al. |
| 2002/0025487 A1* | 2/2002 | Lambert et al. ............. 430/122 |

OTHER PUBLICATIONS

K. Masters, "Spray Drying", 1972, pp. 314-317.
U.Enz, "Magnetism and Magnetic Materials: Historical Developments and Present Role in Industry and Technology", 1982, Ferromagnetic Materials, vol. 3, pp. 502-209.

* cited by examiner

*Primary Examiner*—John L Goodrow
(74) *Attorney, Agent, or Firm*—Carl F. Ruoff

(57) ABSTRACT

Hard magnetic core particles for use in the development of electrostatic latent images are produced by combining ferric oxide, a strontium oxide precursor, an oxygenated boron compound and a binder to form a mixture, wherein the strontium oxide precursor is preferably present in an amount that provides SrO in a molar amount that is in excess of a stoichiometric amount that provides a ratio of $Fe_2O_3$ to SrO of 6/1. The mixture can be formed into green beads and the green beads can be fired to form the hard magnetic core particles.

16 Claims, 14 Drawing Sheets

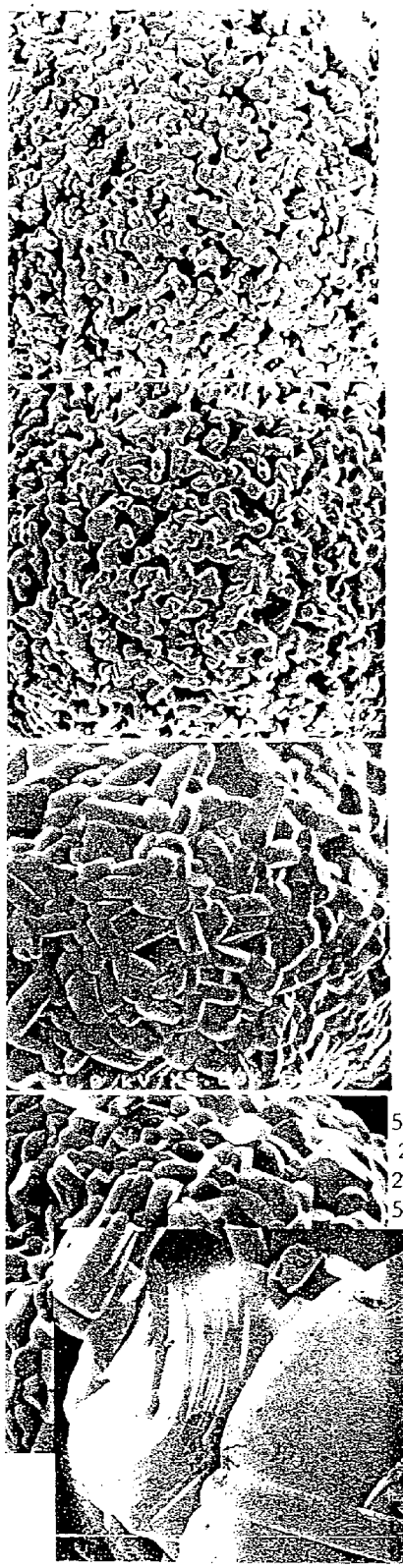
A.
5.7/1 1050°C
3524 Oe
Ms = 53.9 emu/g
Mr = 35.2 emu/g
5000X
B.
5.7/1 1100°C
3804 Oe
Ms = 51.7
Mr = 333
5000X
C.
5.7/1 1200°C
2934 Oe
Ms = 53.0 emu/g
Mr = 33.3 emu/g
5000X
D1.
5.7/1 1250°C
2 preps
2630 Oe 1460 Oe
5000X
D2.
5.7/1 Stoichiometry Temperature series
Figure 5: 5.7/1 control temperature series
E.
5.7/1 1300°C
2616 Oe
Ms = 51.2 emu/g
Mr = 31 emu/g
5000X
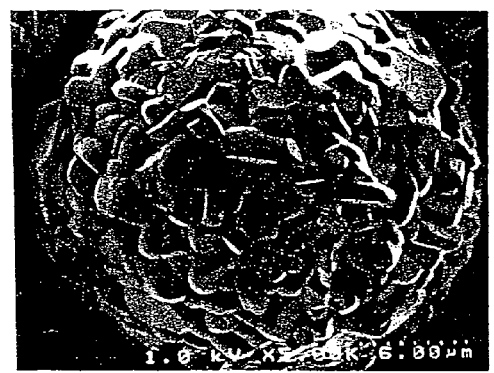

Stoichiometry series - 1200°C
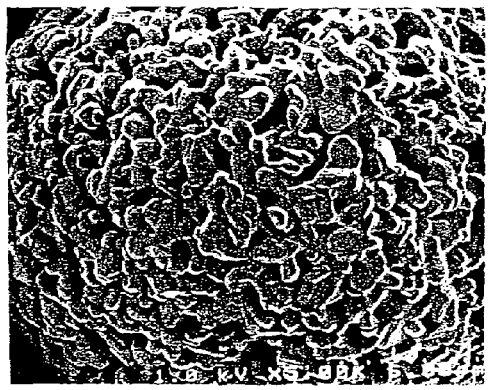
A. 6/1 3898 Oe
B. 5.7/1 2934 Oe
(5% Sr excess)
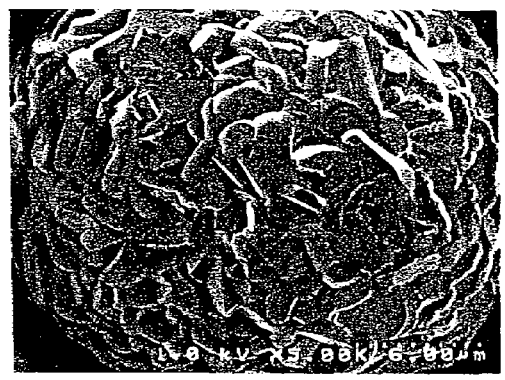
C. 5.45/1 2610 Oe
(10% Sr Excess)
D. 5/1 2133 Oe
(20% Sr excess)
E. 4.6/1 2199 Oe
(30% Sr excess)
Figure 6: Control Stoichiometry 1200°C Figure 7
5% SrB2O4 Temperature Series
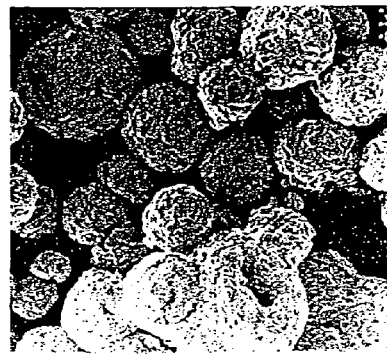
A1.
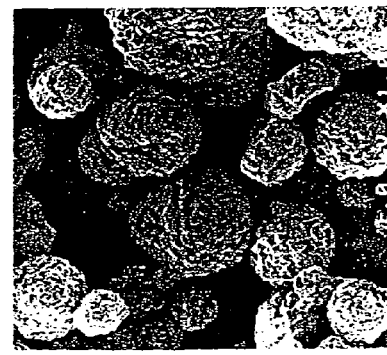
B1.
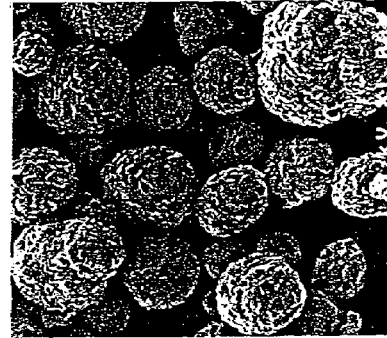
C1.
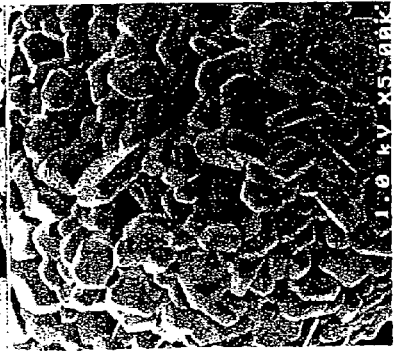
A2.
B2.
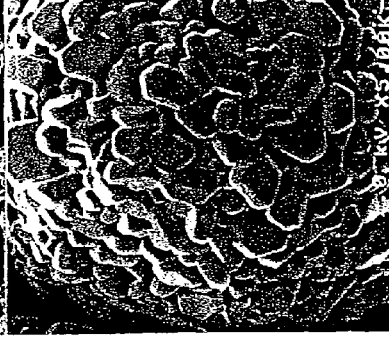
C2.
5% SrB2O4 1100°C
3803 Oe Ms =51.8 emu/g
Mr = 33.1 emu/g
5% SrB2O4 1150°C
3734 Oe Ms =55.2 emu/g
Mr = 35.4 emu/g
5% SrB2O4 1200°C
3661 Oe Ms =52.9 emu/g
Mr = 33.8 emu/g

HARD MAGNETIC CORE PARTICLES AND A METHOD OF MAKING SAME

BACKGROUND OF THE INVENTION

The present invention relates to electrophotography and more particularly, to hard magnetic core particles for use in electrophotography that can be produced by a low temperature process.

In electrophotography, an electrostatic charge image is formed on a dielectric surface, typically the surface of the photoconductive recording element. Development of this image is typically achieved by contacting it with a two-component developer comprising a mixture of pigmented resinous particles, known as toner, and magnetically attractable particles, known as carrier. The carrier particles serve as sites against which the non-magnetic toner particles can impinge and thereby acquire a triboelectric charge opposite to that of the electrostatic image. During contact between the electrostatic image and the developer mixture, the toner particles are stripped from the carrier particles to which they had formerly adhered (via triboelectric forces) by the relatively strong electrostatic forces associated with the charge image. In this manner, the toner particles are deposited on the electrostatic image to render it visible.

Typically, carrier particles used in a rotating core development system contain a core made of a hard magnetic ferrite material such as $SrFe_{12}O_{19}$ having a single-phase, hexagonal crystal structure. Methods of preparing magnetic ferrite materials are described, for example, in U.S. Pat. Nos. 3,716,630; 4,623,603; 5,332,645; and 4,042,518, the teachings of which are incorporated herein by reference in their entirety; European Patent Application No. 0 086 445; "Spray Drying" by K. Masters published by Leonard Hill Books London, pages 314-317 and "Ferromagnetic Materials", Volume 3 edited by E. P. Wohlfarth and published by North-Holland Publishing Company, Amsterdam, N.Y., Oxford, pages 502-509, the teachings of which are also incorporated herein by reference. In particular, commercially-prepared $SrFe_{12}O_{19}$ core particles are typically prepared by a method in which $Fe_2O_3$ and $SrCO_3$ powders are combined with a binder and the mixture is spray dried to form green beads, which are subsequently fired, typically at a temperature of about 1300° C. In this method, an amount of $SrCO_3$ is used in excess of the amount required to provide a 6/1 ratio of $FeO_3$ to SrO ($SrCO_3$ is converted into SrO during the firing.). The excess amount of SrO helps to densify the green beads.

A disadvantage of the commercial method of making $SrFe_{12}O_{19}$ using excess SrO is that at the normal firing temperature, the grain growth is rapid and uncontrolled, resulting in variable coercivity of the material. Further, the densification process provides hard sagger ingots that must be deagglomerated to recover the original bead particle size distribution. The deagglomeration process can result in a loss of 15-20% of the material through a classification step to remove the fines that are produced by deagglomeration. Further, the retained particle distribution contains fractured and irregular beads.

A further disadvantage of the commercial method of making $SrFe_{12}O_{19}$ is that the formulation that is used requires high temperatures in the range of 1300° C. Reduced firing temperatures do not yield sufficiently densified cores to achieve optimum density.

A further disadvantage of the commercial method of making $SrFe_{12}O_{19}$ is that excess SrO leads to the formation of surface salts that can impact triboelectric properties. In particular, excess SrO transforms to $Sr(OH)_2$, and then to $Sr(OH)_2 8H_2O$, and eventually to $SrCO_3$. These compounds affect the charge of the core particles and influence the charge to mass ratio (Q/m) of solution-coated and dry-coated carriers that are prepared from the bare core particles. The variability in the amount of these compounds that are formed on individual core particles affects the uniformity of the core particles.

Accordingly, there is a need for a method of forming hard magnetic core particles, wherein a lower temperature can be used.

Further, there is a need for a method of forming hard magnetic core particles, wherein the extent of deagglomeration required after firing is reduced, leading to a reduction in product loss and a reduction in fractured or irregular particles.

Further, there is a need for a method of forming hard magnetic core particles, wherein the formation of surface salts resulting from the transformation of excess SrO is avoided.

Further, there is a need for a method of forming hard magnetic core particles wherein the particles have a constant coercivity and Q/m even when process and formulation variables are varied.

SUMMARY OF THE PRESENT INVENTION

A feature of the present invention is to provide a method of forming hard magnetic core particles, wherein a lower temperature can be used.

Another feature of the present invention is to provide a method of forming hard magnetic core particles, wherein the extent of deagglomeration required after firing is reduced, leading to a reduction in product loss and a reduction in fractured or irregular particles.

Another feature of the present invention is to provide a method of forming hard magnetic core particles, wherein the formation of surface salts resulting from the transformation of excess SrO is avoided.

Another feature of the present invention is to provide a method of forming hard magnetic core particles wherein the particles have a constant coercivity and Q/m even when process and formulation variables are varied.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description and appended claims.

To achieve these objectives and other advantages, and in accordance with the purposes of the present invention as embodied and broadly described herein, the present invention relates to a method of forming hard magnetic core particles for use in the development of electrostatic latent images. The method can include the steps of combining ferric oxide, a strontium oxide precursor, an oxygenated boron compound and a binder to form a mixture, wherein the amount of the strontium oxide precursor in the mixture is in excess of a stoichiometric amount that provides a ratio of $Fe_2O_3$ to SrO of 6/1, forming the mixture into green beads and firing the green beads to form the hard magnetic particles.

The present invention further relates to hard magnetic core particles made by a method of the present invention.

The present invention further relates to developer compositions comprising toner particles and carrier particles wherein the carrier particles include hard magnetic core particles made by a method of the present invention.

The present invention further relates to hard magnetic core particles for electrophotography that contain strontium ferrite and strontium borate(s).

The present invention further relates to developer compositions containing toner particles and carrier particles wherein the carrier particles include hard magnetic core particles that contain strontium ferrite and strontium borate(s) or phases thereof.

It is to be understood that both the foregoing general description and the following detailed description are exemplary and explanatory only and are intended to provide further explanation of the present invention, as claimed.

BRIEF DESCRIPTION OF THE DRAWINGS

FIGS. 5A, 5B, 5C, 5D1, 5D2 and 5E (control) are scanning electron micrographs of hard magnetic core particles having an Fe/Sr stoichiometry of 5.7/1 (5 mole % excess of SrO), over a range of firing temperatures. The particles in this series do not contain $B_2O_3$.

FIGS. 6A-6E (control) are scanning electron micrographs of hard magnetic core particles over a range of stoichiometries and prepared at a firing temperature of 1200° C.

FIGS. 7A1, 7A2, 7B1, 7B2, 7C1, and 7C2 are scanning electron micrographs of hard magnetic core particles having a 5 mole % excess of SrO and a molar amount of $B_2O_3$ equal to the excess), over a range of firing temperatures.

FIGS. 8A1, 8A2, 8B1, 8B2, 8C1, and 8C2 are scanning electron micrographs of hard magnetic core particles having a 10 mole % excess of SrO and a molar amount of $B_2O_3$ equal to the excess), over a range of firing temperatures.

FIGS. 9A1, 9A2, 9B1, 9B2, 9C1, and 9C2 are scanning electron micrographs of hard magnetic core particles having a 20 mole % excess of SrO and a molar amount of $B_2O_3$ equal to the excess, over a range of firing temperatures.

FIGS. 10A1, 10A2, 10B1, 10B2, 10C1, and 10C2 are scanning electron micrographs of hard magnetic core particles having a 30 mole % excess of SrO and a molar amount of $B_2O_3$ equal to the excess, over a range of firing temperatures.

FIGS. 11A1, 11A2, 11B1 and 11B2 are scanning electron micrographs of hard magnetic core particles having a 5 mole % excess of SrO and a molar amount of $B_2O_3$ equal to twice the excess, at two different firing temperatures.

FIGS. 12A1, 12A2, 12B1 and 12B2 are scanning electron micrographs of hard magnetic core particles having a 10 mole % excess of SrO and a molar amount of $B_2O_3$ equal to twice the excess, at two different firing temperatures.

FIGS. 13A1, 13A2, 13B1 and 13B2 are scanning electron micrographs of hard magnetic core particles having a 20 mole % excess of SrO and a molar amount of $B_2O_3$ equal to twice the excess, at two different firing temperatures.

FIGS. 14A1, 14A2, 14B1, 14B2, 14C1, and 14C2 are scanning electron micrographs of hard magnetic core particles having a 30 mole % excess of SrO and a molar amount of $B_2O_3$ equal to twice the excess, over a range of firing temperatures.

DETAILED DESCRIPTION OF THE PRESENT INVENTION

Figure 1:
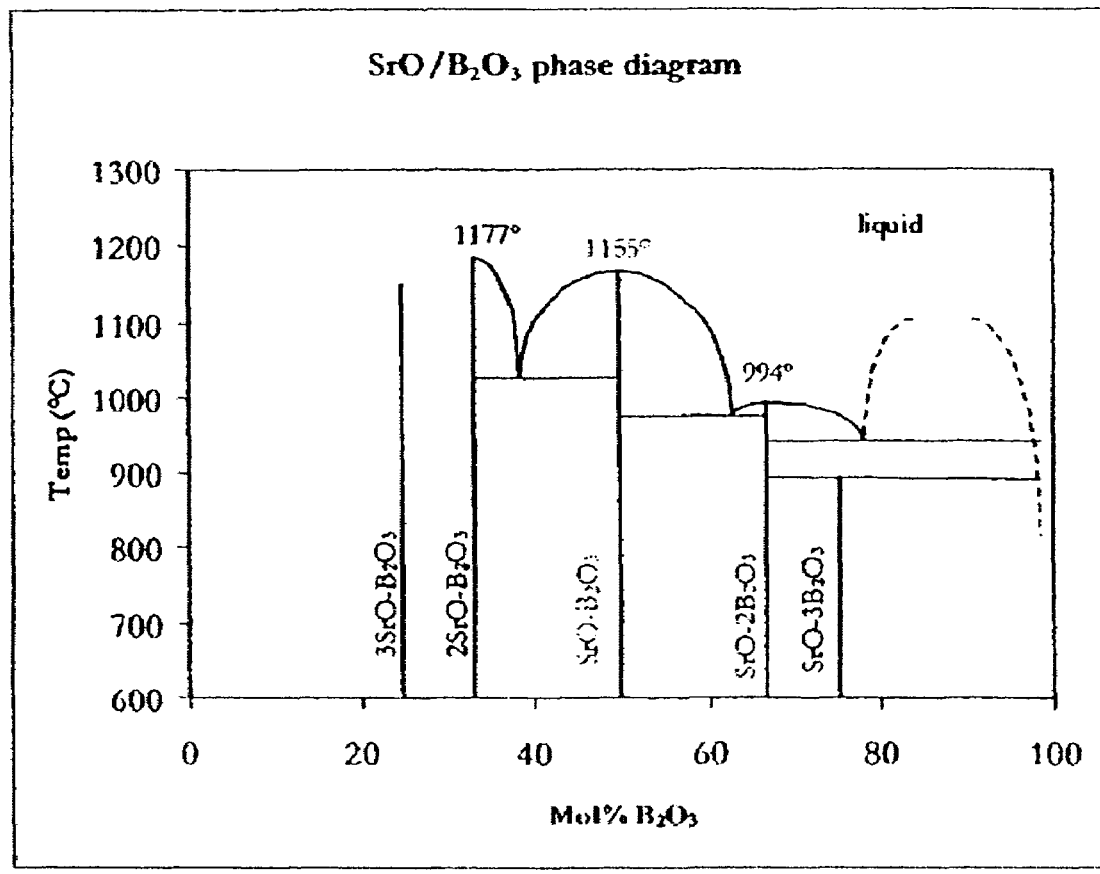
FIG. 1 is an $SrO/B_2O_3$ phase diagram.

The present invention, in part, relates to a method of making hard magnetic core particles that can be carried out at a reduced temperature. In more detail, the present invention, in part, relates to a method of making strontium ferrite core particles for use in electrophotography.

Initially, in the method, at least one ferric oxide, at least one strontium oxide precursor and at least one oxygenated boron compound are combined with a binder to form a mixture. The ferric oxide can be any form of ferric oxide such as, for example, alpha-ferric oxide ($\alpha$-$F_2O_3$). The strontium oxide precursor can be any strontium compound, such as a strontium salt, that converts to strontium oxide during the firing process. For example, the strontium oxide precursor may be a strontium carbonate, nitrate, phosphate and/or sulfate. A specific non-limiting example of a strontium oxide precursor is strontium carbonate. The oxygenated boron compound can be any compound that provides borate. A specific non-limiting example of a preferred oxygenated boron compound is boric acid. The amount of ferric oxide, strontium compound, and oxygenated boron compound used in the method of the invention is discussed in more detail below. Typically, the ferric oxide, strontium oxide precursor and oxygenated boron compound are in powdered form though other forms are possible. The binder can be any compound or composition that is capable of binding the other ingredients when the mixture is formed into green beads and that decomposes or becomes volatile during firing so that it is removed. For example, the binder may be or contain an organic compound, such as, for example, an organic polymer, or can be an aqueous solution, such as water. Examples of binders include a formulation of polyvinyl alcohol and Dispex, an aqueous acrylic polymer from Ciba Specialty Chemicals, or a formulation of gum arabic and DAXAD, an ammonium polymethacrylate available from Hampshire Chemical Co. Other examples of binders are disclosed, for example, in U.S. Pat. No. 5,316,882, incorporated herein by reference.

More than one type of each component described above may be used. For example, two or more ferric oxides, two or more strontium oxide precursors, two or more oxygenated boron compounds and/or two or more binders may be used.

The amount of the strontium oxide precursor in the initial mixture is an amount that provides SrO in excess of the amount needed for a ratio of $Fe_2O_3/SrO$ of 6/1 (that is, in excess of the stoichiometric amount needed to form $SrFe_{12}O_{19}$). In the description and examples herein, a composition having a 6/1 ratio of $Fe_2O_3/SrO$ will be referred to as having a 0 mole % excess of SrO; a composition having a 5.7/1 ratio of $Fe_2O_3/SrO$ will be referred to as having a 5 mole % excess of SrO; a composition having a 5.5/1 ratio of $Fe_2O_3/SrO$ will be referred to as having a 10 mole % excess of SrO; a composition having a 5.0/1 ratio of $Fe_2O_3/SrO$ will be referred to as having a 20 mole % excess of SrO; and a composition having a 4.6/1 ratio of $Fe_2O_3/SrO$ will be referred to as having a 30 mole % excess of SrO. It is to be understood that compositions of the present invention are not limited to these exact amounts, but that the amount of the strontium oxide precursor can be any amount that provides an excess of SrO, preferably, an excess of more than 0 mole % and less than 30 mole %. As a non-limiting example, the amount of the strontium oxide precursor can be an amount that provides an excess of SrO of from about 5 to about 30 mole %. As another non-limiting example, the amount of the strontium oxide precursor can be an amount that provides an excess of SrO of from about 5 to about 20 mole %.

The amount of oxygenated boron compound in the initial mixture is an amount that provides borate that may act as a mineralizer with the excess SrO. The preferred amount of the oxygenated boron compound that is added can be understood by referring to the $SrO/B_2O_3$ phase diagram of FIG. 1, which shows the phases of strontium borate compounds with varying amounts of borate. This diagram is provided for guidance and not intended as a limitation of the present invention. In particular, the phase diagram may not necessarily reflect the phase mixture in an iron-rich $SrO/6Fe_2O_3$ reaction matrix. Without being bound to any particular theory, it is theorized that the borate combines with excess SrO to form $SrB_2O_4$ when the molar amount of $B_2O_3$ is about equal to the amount of excess SrO, and to form $SrB_4O_7$ when the molar amount of $B_2O_3$ is about double the amount of excess SrO. Iron containing phases of the above material can also be present. For the method of the present invention, the amount of the oxygenated boron compound may be an amount that provides a molar amount of $B_2O_3$ that is equal to the amount of excess SrO (thereby theoretically providing $SrB_2O_4$) or an amount that provides a molar amount of $B_2O_3$ that is double the amount of excess SrO (thereby theoretically providing $SrB_4O_7$). The amount of the oxygenated boron compound may be an amount that is between these two molar amounts, thereby theoretically providing a mixture of $SrB_2O_4$ and $SrB_4O_7$ and may be greater or lesser than these amounts, providing other phases of $SrO/B_2O_3$ as shown, for example, in FIG. 1.

The amount of binder in the mixture is not critical and can be any suitable amount to bind the remaining ingredients when the mixture is formed into green beads.

The at least one ferric oxide, at least one strontium oxide precursor, at least one oxygenated boron compound and binder can be combined in any suitable manner to form the mixture. For example, the ingredients may be combined at any suitable temperature and/or pressure and may be combined in any order, such as, for example, sequentially or all at once.

The mixture of the ferric oxide, strontium oxide precursor, oxygenated boron compound and binder is formed into green beads by any method known in the art. The term "green beads" is used in its commonly understood meaning in the art to mean particles that have not yet been densified by firing and that still contain a binder. A preferred method to form green beads is to convert the mixture into a liquid slurry by ball milling and then to spray dry the slurry according to conventional spray drying methods. Spray drying methods are generally known in the art and are taught in more detail, for example, in K. Masters, Spray Drying Handbook, Longman Scientific and Technical, 1991, incorporated in its entirety herein. In a spray drying method, liquid droplets are formed during the spray drying process, and upon evaporation, the droplets form individual green beads of substantially uniform particle size and substantially spherical shape.

Thereafter, the green beads are fired at a sufficient temperature and for a sufficient amount of time to cause the removal of the binder and to effect the densification of the beads and to thereby form hard magnetic core particles. It is an advantage of the present invention that the firing temperature may be about 100 to 200° C. less than the temperature that is typically used for firing green beads to form hard magnetic core particles. In particular, the firing temperature may be below 1,150° C. As a non-limiting example, the firing temperature may be from about 1,000 to about 1,150° C. A typical firing time may be from about 10 to about 20 hours. Any suitable apparatus may be used for firing such as a rotary kiln, a tunnel kiln or a box furnace, or other heating device.

If necessary, the hard magnetic core particles may then be deagglomerated by any suitable means.

The method of the present invention can be carried out by any suitable processing method, including, but not limited to, a batch process, a continuous process, or a semi-continuous process.

The present invention further relates in part to particles formed by a method as described herein. For example, the hard magnetic core particles may be those formed by combining at least one ferric oxide, at least one strontium oxide precursor, at least one oxygenated boron compound, and at least one binder to form a mixture, wherein the strontium oxide precursor is present in an amount that provides SrO in a molar amount that is in excess of a stoichiometric amount that provides a ratio of $Fe_2O_3$ to SrO of 6/1, forming the mixture into green beads, and firing the green beads to form the hard magnetic core particles. As a non-limiting example, the hard magnetic core particles may be those formed by this method wherein the firing is at a temperature of less than about 1150° C., or preferably, from about 1000 to about 1150° C. As another non-limiting example, the hard magnetic core particles may be those formed by this method wherein the particles are agglomerated. As another non-limiting example, the hard magnetic core particles may be those formed by this method wherein the mixture contains an amount of a strontium oxide precursor that provides about 5 to about 30 mole % excess of SrO and wherein the mixture contains the oxygenated boron compound in an amount that provides $B_2O_3$ in a molar amount equal to the about 5 to about 30 mole % excess of SrO or a molar amount that is twice the about 5 to about 30 mole % excess of SrO or a molar amount therebetween. As another non-limiting example, the hard magnetic core particles may be those formed by this method wherein the mixture contains an amount of a strontium oxide precursor that provides about 5 to about 20 mole % excess of SrO and wherein the mixture contains the oxygenated boron compound in an amount that provides $B_2O_3$ in a molar amount equal to the about 5 to about 20 mole % excess of SrO or a molar amount that is twice the about 5 to about 20 mole % excess of SrO or a molar amount therebetween. As another non-limiting example, the hard magnetic core particles may be those formed by this method wherein the step of forming the mixture into green beads is accomplished by converting the mixture into a liquid slurry, for instance, by ball milling, and then spray drying the liquid slurry to form the green beads.

During any of the aforementioned processes (mixing, forming green beads and firing) in the foregoing method, the ferric oxide, strontium oxide precursor and oxygenated boron compound may interact so that the hard magnetic core particles so formed comprise a mixture of strontium ferrite and strontium borate, particularly, particles wherein the strontium borate is $SrB_2O_4$ or $SrB_4O_7$ or a combination thereof.

Accordingly, the present invention relates in part to hard magnetic core particles comprising a mixture of strontium ferrite and strontium borate, and, preferably, to hard magnetic core particles comprising a mixture of strontium ferrite and strontium borate wherein the strontium borate is $SrB_2O_4$ or $SrB_4O_7$ or a combination thereof. As a non-limiting example, the hard magnetic core particles may comprise a mixture of strontium ferrite and strontium borate wherein the amount of strontium borate is from about 5 to about 30 mole % of the amount of strontium ferrite. As another non-limiting example, the hard magnetic core particles may comprise a mixture of strontium ferrite and strontium borate wherein the amount of strontium borate is from about 5 to about 20 mole % of the amount of strontium ferrite.

Thereafter, the hard magnetic core particles of the present invention as described herein or as formed by any of the above-described methods, may be kept in a bare state, coated with at least oxide or coated with at least one polymer and used as carrier particles in electrophotography, as described, for example, in the following patents, which are incorporated herein by reference: U.S. Pat. Nos. 4,855,206; 4,990,876; 5,061,586; 5,104,761; 5,190,841; 5,190,842; 5,268,249; 5,306,592; 5,325,161; 5,332,645; 5,381,219; 5,500,320; 5,512,404; 6,228,549; 6,232,026 and 6,723,481. Accordingly, the present invention in part further includes carrier particles comprising the hard magnetic core particles of the present invention as described herein, and includes such particles coated with at least one polymer or coated with at least one oxide.

Typically, as described in the above patents, carrier particles, either in a bare state, coated with at least one oxide or coated with at least one polymer, may be combined with toner particles to form a two-component developer. Accordingly, the present invention in part further relates to a developer composition, such as for example, a two-component developer, comprising toner particles and carrier particles, wherein the carrier particles comprise the hard magnetic core particles of the present invention.

The present invention will be further clarified by the following examples, which are intended to be exemplary of the present invention.

EXAMPLES

Method of Producing Formulations:

The following procedure was used to produce the control and borate formulations as described herein:

The baseline spray dried formulation described in the following examples is produced as follows:

A 5.7/1 $Fe_2O_3/SrO$ molar ratio slurry is prepared from
342.2 g $Fe_2O_3$ (α- phase; MEROX)
55.49 g $SrCO_3$ (Chemical Products Corp—Type D)
400 g dried powder (approximately)
Boric acid, $H_3BO_3$ (ACROS reagent), was used as the $B_2O_3$ source in the formulations containing borate.

Two different binder solutions were used;

1) for the $SrB_2O_4$ series, a 400 g 1.1 wt % polyvinyl alcohol/Dispex formulation, which was prepared from 10 g of 20 wt % Airvol 205S PVA solution, was combined with 2.4 g of Dispex (Ciba) and 387.6 g of distilled water.

2) for the $SrB_4O_7$, series and the control series, a 400 g 4 wt % gum arabic/DAXAD formulation was prepared from 15.76 g of acacia (Eastman Kodak reagent) and 1.31 g DAXAD 32 (ammonium polymethacrylate) and 382.9 g of distilled water.

The powders were added to a 1250 ml glass bottle followed by the addition of binder solution. The pH of the slurry was adjusted with concentrated $NH_4OH$ (Eastman Kodak) to a value of 8-9. 200-300 cc of ⅛" stainless steel or 1 mm zirconium silicate media beads were added to the bottle and the mixture rolled on for 24-48 hours. The resulting mill was pumped to a rotary atomizer running at 16,000 to 32,000 rpm on a Niro Laboratory spray dryer. The dried product ("green bead") was collected with a modified cyclone. Firing took place in alumina trays in a high temperature box furnace. The charges were ramped at 7° C./min to 500° C., at which point a 1 hour dwell was programmed for the burnout of the binder portion of the green bead. Subsequently, the temperature was ramped at 5° C./min to the firing temperature. The charges were held at the firing temperature (1000° C.-1350° C.) for a 10 hour dwell, whereupon the furnace was allowed to cool without control (i.e., "free-fall") to room temperature. The fired charges were deagglomerated with a mortar and pestle with screening through a 200 mesh screen.

Control formulations (without borate) were produced having a 5%, 10%, 20% or 30% molar excess of SrO. The control formulations were fired at various temperatures, ranging from 1050 to 1300° C.

Formulations containing borate were produced having 5%, 10%, 20% and 30% excess SrO and having a molar amount of borate sufficient to theoretically combine with the excess SrO to form $SrB_2O_4$ or $SrB_4O_7$. Formulations having a molar amount of borate to theoretically combine with excess SrO to form $SrB_2O_4$ are referred to in the examples as 5% $SrB_2O_4$, 10% $SrB_2O_4$, 20% $SrB_2O_4$ and 30% $SrB_2O_4$, respectively, depending on the amount of excess borate, and formulations having a molar amount of borate to theoretically combine with excess SrO to form $SrB_4O_7$ are referred to in the examples as 5% $SrB_4O_7$, 10% $SrB_4O_7$, 20% $SrB_4O_7$ and 30% $SrB_4O_7$, respectively, depending on the amount of excess borate. However, these designations are not meant to be a representation that the phases in the formulations are exactly as designated, since the iron-rich reaction matrix may have an effect on the actual phases of $SrO/B_2O_3$ that are formed. The method of the present invention does not depend on having the actual phases of $SrO/B_2O_3$ conform exactly to the theoretical phases.

The formulations are set forth in the following Table

TABLE 1

| Mole % borate | moles Sr | moles $B_2O_3$ | moles Fe | Formula Sr | Formula $B_2O_3$ | Formula Fe | $Fe_2O_3$/SrO Ratio | excess Sr | excess Sr/$B_2O_3$ |
|---|---|---|---|---|---|---|---|---|---|
| n = 1 |
| 5 | 0.376 | 0.019 | 4.286 | 1.05 | 0.053 | 12 | 5.701 | 0.052 | 1.00 |
| 10 | 0.388 | 0.037 | 4.235 | 1.10 | 0.104 | 12 | 5.454 | 0.100 | 0.96 |
| 20 | 0.413 | 0.072 | 4.133 | 1.20 | 0.210 | 12 | 4.999 | 0.200 | 0.95 |
| 30 | 0.437 | 0.106 | 4.037 | 1.30 | 0.315 | 12 | 4.615 | 0.300 | 0.95 |
| n = 2 |
| 5 | 0.374 | 0.037 | 4.261 | 1.05 | 0.105 | 12 | 5.701 | 0.52 | 0.50 |
| 10 | 0.384 | 0.073 | 4.187 | 1.10 | 0.209 | 12 | 5.454 | 0.100 | 0.48 |
| 20 | 0.404 | 0.142 | 4.043 | 1.20 | 0.420 | 12 | 4.999 | 0.200 | 0.48 |
| 30 | 0.423 | 0.205 | 3.909 | 1.30 | 0.630 | 12 | 4.615 | 0.300 | 0.48 |

The formulations containing borate were fired at various temperatures ranging from 1000 to 1200° C. for about a 10 hour dwell, plus additional time for ramping and cooling, and a 1 hour dwell at 500° C., as described above.

Measurements and Characterizations

The procedures used to calculate the data provided in the examples are as follows:

Charge-to-mass (O/m)

For "exercised" charge-to-mass determinations, the toner and carrier were combined and mechanically shaken for 2-3 minutes followed by tumbling of the developer for 10 minutes in a 4 dram screw-cap vial placed in the rotating magnetic field of a SPD development station (2000 rpm, core rotation only). See, for example, U.S. Pat. No. 4,546,060, incorporated by reference herein in its entirety.

Toner charge-to-mass was measured on a developer by separation of the two components under the combined influence of a magnetic and electric field. A 0.05 and 0.15 g sample of developer was placed on a metal plate. A 60 Hz alternating current magnetic field and a DC electric field of 2000 V/cm was applied for 30 seconds. Toner was pulled from the carrier under the influence of the electric field and deposits on an upper plate while the magnetic core particles were held at the lower plate under the influence of the electric and magnetic fields. An electrometer measured the accumulated charge. Toner charge-to-mass was calculated by dividing the accumulated charge by the mass of the deposited toner.

Resistivity

Static powder resistivity on carriers was determined with a Kodak-designed cell. Approximately 2 g of powder was placed on a circular base containing a small, centered, electrode. The top portion of the cell was placed on the bottom electrode base and aligned. A release lever lowered the top piston electrode onto the powder. The depth of the powder was adjusted by physical rotation of the top portion of the cell to 0.04". The average resistivity (ohm-cm) was determined from current measurements (Keithley 616) for three applied voltages in the range of 100-250 V using Ohm's law.

Magnetics

Hysteresis loops were obtained on a retrofit Lakeshore 7300 Vibrating Sample Magnetometer (VSM) with a Tidewater Bipolar power supply. The samples were taken through a 300 point loop to ±8 KG at a slew rate of 53.3 Oe/sec and a data acquisition time constant of 0.1 seconds.

X-ray Diffraction

Powder diffraction scans of selected samples were provided by the Analytical Technology Department of Eastman Kodak. Samples were prepared by the front load packing method with a few drops of Base Oil to keep the sample in the holder during analysis. The scans were then matched to the JCPDS database.

Particle Size

Particle size distributions were gathered for several samples using an Aerosizer instrument.

Scanning Electron Microscopy

SEMs were obtained on cores with a Hitachi S-4100 instrument operating at an accelerating voltage of 1 kV.

Results

Resistivity and Particle Size Distribution

Resistivities were obtained for all the $B_2O_3$ samples and were in the same 1010-1011 ohm-cm range as the standard 5.7/1 formulation (data not shown). Particle size distributions were also largely unchanged throughout the $B_2O_3$ samples except for the higher $B_2O_3$ loadings at high temperature, which exhibited high fines from the deagglomeration of the sintered ingots. The standard formulation also suffered from similar effects at the higher SrO ratios (data not shown).

Scanning Electron Microscopy

The SEMs of the borate formulations (FIGS. 5-14) consistently show a fine-grained core for all of the samples except for the 30% formulations at higher temperatures. The small, lower-aspect ratio crystal grains comprising each core bead correlate to a high coercivity.

Magnetic Properties

The magnetic properties, including intrinsic coercivity (Hcj), saturation magnetization (Ms) and residual magnetization (Mr) of the borate formulations are shown in the following Table 2:

TABLE 2

| Composition | Stoichiometry | Firing temp. (° C.) | $H_{ci}$ (Oe) | $M_s$ (emu/g) | $M_r$ (emu/g) |
|---|---|---|---|---|---|
| 5% $SrB_2O_4$ | 5.7/1 | 1100 | 3803 | 51.8 | 33.1 |
| 10% $SrB_2O_4$ | 5.5/1 | 1100 | 3808 | 52.4 | 33.6 |
| 20% $SrB_2O_4$ | 5.0/1 | 1100 | 3776 | 48.6 | 31.2 |
| 30% $SrB_2O_4$ | 4.6/1 | 1100 | 3962 | 44.9 | 28.9 |
| 5% $SrB_2O_4$ | 5.7/1 | 1150 | 3734 | 55.2 | 35.4 |
| 10% $SrB_2O_4$ | 5.5/1 | 1150 | 3712 | 52.3 | 33.6 |
| 20% $SrB_2O_4$ | 5.0/1 | 1150 | 3732 | 46.8 | 29.9 |
| 30% $SrB_2O_4$ | 4.6/1 | 1150 | 3902 | 47.3 | 30.3 |
| 5% $SrB_2O_4$ | 5.7/1 | 1200 | 3661 | 52.9 | 33.8 |
| 10% $SrB_2O_4$ | 5.5/1 | 1200 | 3658 | 51.5 | 32.9 |
| 20% $SrB_2O_4$ | 5.0/1 | 1200 | 3662 | 49.4 | 31.6 |
| 30% $SrB_2O_4$ | 4.6/1 | 1200 | 3741 | 48.1 | 30.3 |
| 30% $SrB_4O_7$ | 4.6/1 | 1000 | 3086 | 33.5 | 21 |
| 5% $SrB_4O_7$ | 5.7/1 | 1050 | 3744 | 49.8 | 31.9 |
| 10% $SrB_4O_7$ | 5.5/1 | 1050 | 3877 | 44.3 | 28.4 |
| 20% $SrB_4O_7$ | 5.0/1 | 1050 | 3288 | 35.9 | 22.6 |
| 30% $SrB_4O_7$ | 4.6/1 | 1050 | 3148 | 30.2 | 19.2 |
| 5% $SrB_4O_7$ | 5.7/1 | 1100 | 3728 | 49.2 | 31.5 |
| 10% $SrB_4O_7$ | 5.5/1 | 1100 | 3792 | 43.7 | 27.7 |
| 20% $SrB_4O_7$ | 5.0/1 | 1100 | 3409 | 36.5 | 23 |
| 30% $SrB_4O_7$ | 4.6/1 | 1100 | 3288 | 29.5 | 18.7 |
| 5% $SrB_4O_7$ | 5.7/1 | 1150 | 3669 | 49.4 | 31.6 |
| 10% $SrB_4O_7$ | 5.5/1 | 1150 | 3760 | 43.6 | 27.8 |
| 20% $SrB_4O_7$ | 5.0/1 | 1150 | 3430 | 36.6 | 22.9 |
| 30% $SrB_4O_7$ | 4.6/1 | 1150 | 3388 | 28.4 | 18 |

As comparative examples, the magnetic properties, including intrinsic coercivity (Hcj), saturation magnetization (Ms) and residual magnetization (Mr) of the control formulations (excess Sr without borate) are shown in Table 3:

TABLE 3

| Composition | Stoichiometry | Firing temp. (° C.) | $H_{ci}$ (Oe) | $M_s$ (emu/g) | $M_r$ (emu/g) |
|---|---|---|---|---|---|
| 5% | 5.7/1 | 1050 | 3542 | 53.9 | 35.2 |
| 5% | 5.5/1 | 1100 | 3804 | 51.7 | 33.3 |
| 30% | 4.6/1 | 1100 | 3921 | 48.7 | 31.3 |
| 0% | 6.0/1 | 1150 | 3842 | 52.2 | 33.7 |
| 5% | 5.7/1 | 1150 | 3340 | 56.3 | 35.6 |
| 5% | 5.7/1 | 1150 | 3895 | 54.4 | 35.0 |
| 10% | 5.5/1 | 1150 | 3562 | 51.5 | 32.8 |
| 20% | 5.0/1 | 1150 | 3391 | 52.5 | 33.4 |
| 30% | 4.6/1 | 1150 | 3240 | 50.9 | 32.2 |
| 0% | 6.0/1 | 1200 | 3898 | 51.5 | 33.2 |
| 5% | 5.7/1 | 1200 | 2934 | 53 | 33.3 |
| 10% | 5.5/1 | 1200 | 2610 | 54.3 | 33.5 |
| 20% | 5.0/1 | 1200 | 2133 | 53.2 | 30.6 |
| 30% | 4.6/0 | 1200 | 2199 | 53 | 30.7 |
| 0% | 6.0/1 | 1250 | 3290 | 53 | 33.7 |
| 5% | 5.7/1 | 1250 | 1460 | 53.5 | 25.1 |
| 10% | 5.5/1 | 1250 | 2343 | 53.6 | 30.9 |
| 20% | 5.0/1 | 1250 | 2710 | 52.7 | 32.7 |
| 30% | 4.6/1 | 1250 | 2771 | 51.1 | 31.7 |
| 0% | 6.0/1 | 1300 | 2485 | 53.1 | 32.5 |
| 5% | 5.7/1 | 1300 | 2616 | 51.2 | 31 |
| 10% | 5.5/1 | 1300 | 2605 | 50.8 | 31.1 |
| 20% | 5.0/1 | 1300 | 2685 | 51.1 | 31.3 |
| 30% | 4.6/1 | 1300 | 2872 | 49.6 | 30.4 |

Figure 2:
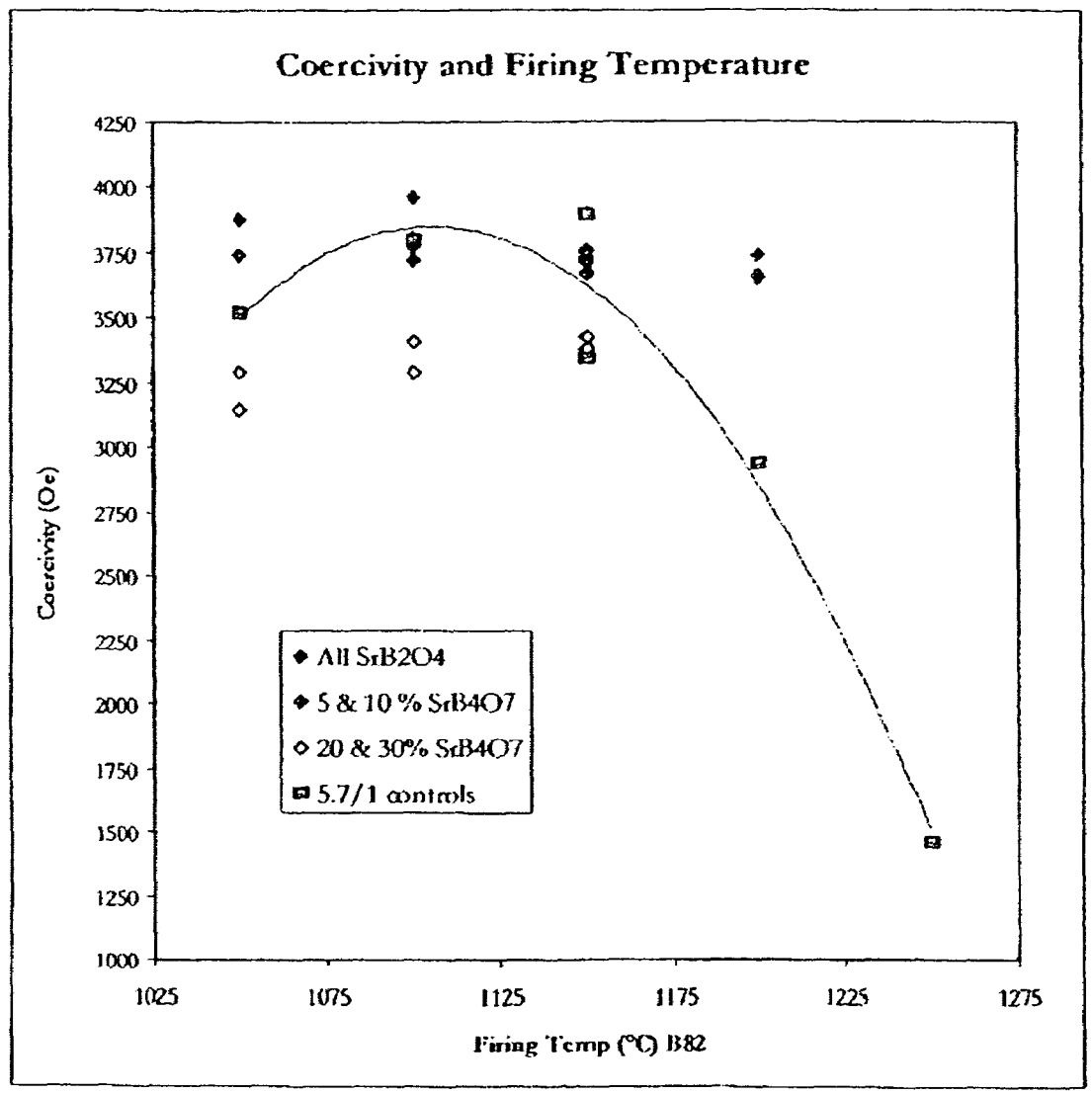
FIG. 2 is a graph showing coercivity as a function of firing temperature for hard magnetic core particles containing varying amounts of excess Sr and $B_2O_3$.

Based on the above data, the relationship between coercivity and firing temperatures for all of the borate formulations and for the 5.7/1 control is shown in FIG. 2. As shown in FIG. 2, the coercivity of most of the borate samples is nearly constant. This is a dramatic improvement over the 5.7/1 control firings or the other control stoichiometries (not shown on the graph). It was found that 1300° C. firings of control samples show stable coercivities, but this processing temperature may not be practical because of possible agglomeration.

Charge to Mass and Tribocharges

Charge-to-mass and tribocharge values for the $SrB_2O_4$, $SrB_4O_7$, and control formulations are shown in Tables 4, 5, and 6, respectively:

TABLE 4

$SrB_2O_4$ tribocharges

| Mole % $SrB_2O_4$ | Firing temp. | Q/m | TC |
|---|---|---|---|
| 5 | 1100 | −66.0 | 9.9 |
| 10 | 1100 | −66.9 | 9.8 |
| 20 | 1100 | −63.3 | 10.3 |
| 30 | 1100 | −56.7 | 10.3 |
| | mean | −64.0 | 10.1 |
| | stdev | 5.6 | 0.3 |
| 5 | 1150 | −62.2 | 9.9 |
| 10 | 1150 | −65.8 | 9.8 |
| 20 | 1150 | −61.3 | 10.3 |
| 30 | 1150 | −60.4 | 10.3 |
| | mean | −62.4 | 10.2 |
| | stdev | 2.4 | 0.3 |
| 5 | 1200 | −65.5 | 9.9 |
| 10 | 1200 | −68.0 | 9.8 |
| 20 | 1200 | −61.4 | 10.3 |
| 30 | 1200 | −55.0 | 10.3 |
| | mean | −62.5 | 10.0 |
| | stdev | 5.7 | 0.2 |
| | overall mean | −63.0 | 10.1 |
| | overall stdev | 4.4 | .025 |

TABLE 5

$SrB_4O_7$ tribocharges

| Mole % $SrB_4O_7$ | Firing temp. | Q/m | TC |
|---|---|---|---|
| 5 | 1000 | −67.9 | 10.2 |
| 10 | 1000 | −52.1 | 9.1 |
| 30 | 1100 | −44.3 | 9.8 |
| | mean | −54.8 | 9.7 |
| | stdev | 12.0 | 0.6 |
| 5 | 1050 | −60.1 | 9.6 |
| 10 | 1050 | −59.1 | 10.2 |
| 20 | 1050 | −47.3 | 9.4 |
| 30 | 1050 | −36.6 | 9.3 |
| | mean | −50.8 | 9.6 |
| | stdev | 11.1 | 0.4 |
| 5 | 1100 | −70.9 | 9.3 |
| 10 | 1100 | −58.9 | 9.9 |
| 20 | 1100 | −48.1 | 9.5 |
| 30 | 1100 | −39.1 | 9.8 |
| | mean | −54.3 | 9.6 |
| | stdev | 13.8 | 0.3 |
| 5 | 1150 | −71.1 | 9.7 |
| 10 | 1150 | −62.1 | 10.5 |
| 20 | 1150 | −48.7 | 10.3 |
| 30 | 1150 | −39.6 | 10.3 |
| | mean | −56.1 | 10.2 |
| | stdev | 15.1 | 0.3 |
| | overall mean | −53.9 | 9.8 |
| | Overall stdev | 11.9 | 0.42 |

TABLE 6

Control tribocharges

| Mole % SrO excess | Firing temp. | Q/m | TC |
|---|---|---|---|
| 5 | 1100 | −54.8 | 11.2 |
| 10 | 1100 | −68.7 | 10.0 |
| 20 | 1100 | −51.0 | 10.8 |
| 30 | 1100 | −58.9 | 10.6 |
| | mean | −58.4 | 10.7 |
| | stdev | 7.6 | 0.5 |
| 5 | 1150 | −58.3 | 10.8 |
| 10 | 1150 | −64.6 | 10.2 |
| 20 | 1150 | −59.1 | 10.0 |
| 30 | 1150 | −64.6 | 9.6 |
| | mean | −61.7 | 10.2 |
| | stdev | 3.4 | 0.5 |
| 5 | 1200 | −66.2 | 9.2 |
| 10 | 1200 | −66.8 | 9.1 |
| 20 | 1200 | −58.7 | 9.9 |
| 30 | 1200 | −63.5 | 9.0 |
| | mean | −63.8 | 9.3 |
| | stdev | 3.7 | 0.4 |
| 5 | 1250 | −55.2 | 8.9 |
| 10 | 1250 | −54.8 | 10.4 |
| 20 | 1250 | −48.2 | 9.7 |
| 30 | 1250 | −48.8 | 7.4 |
| | mean | −58.8 | 9.1 |
| | stdev | 3.8 | 1.3 |
| 5 | 1300 | −56.5 | 9.7 |
| 10 | 1300 | −45.2 | 8.0 |
| 20 | 1300 | −42.0 | 10.2 |
| 30 | 1300 | −41.8 | 11.7 |
| | mean | −46.4 | 9.9 |
| | stdev | 6.9 | 1.5 |
| | overall mean | −56.4 | 9.8 |
| | Overall stdev | 8.2 | 1.0 |

As shown in Table 4, the $SrB_2O_4$ series exhibits surprising Q/m stability, having a standard deviation of 4.4 μC/g over the entire process and compositional range. The developed TC is usually near the 10% build value (stdev=0.25%), indicating minimal carrier pickup and well-behaved charge distribution. As shown in Table 5, the $SrB_4O_7$ series exhibits a larger Q/m variation, but a similar TC stability. The charge-to-mass varies as a trend rather than being random. In contrast to the Q/m values for $SrB_2O_4$ series and the $SrB_4O_7$ series, the Q/m values for the control series do not follow predictable trends across the temperatures, as shown in Table 6. The TC variability is significantly higher in the control series.

Figure 3:
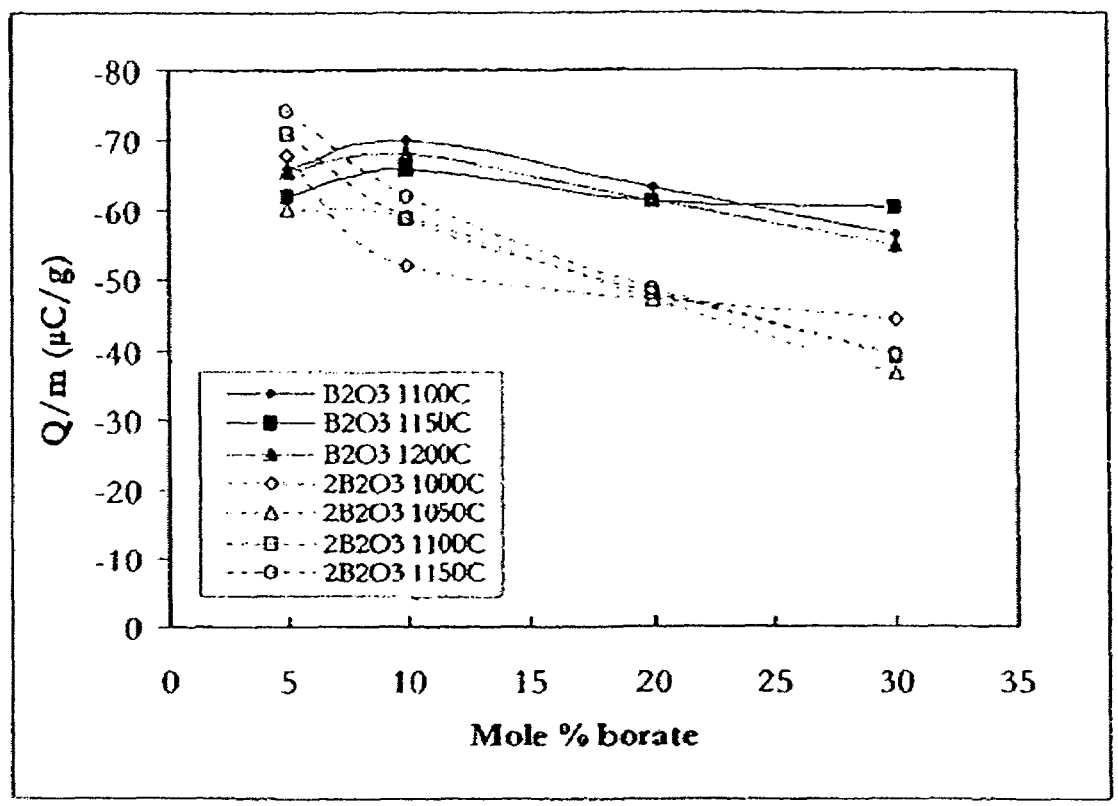
FIG. 3 is a graph showing Q/m values for developer compositions containing hard magnetic core particles having varying amounts of excess Sr and $B_2O_3$ over a range of firing temperatures.
Figure 4:
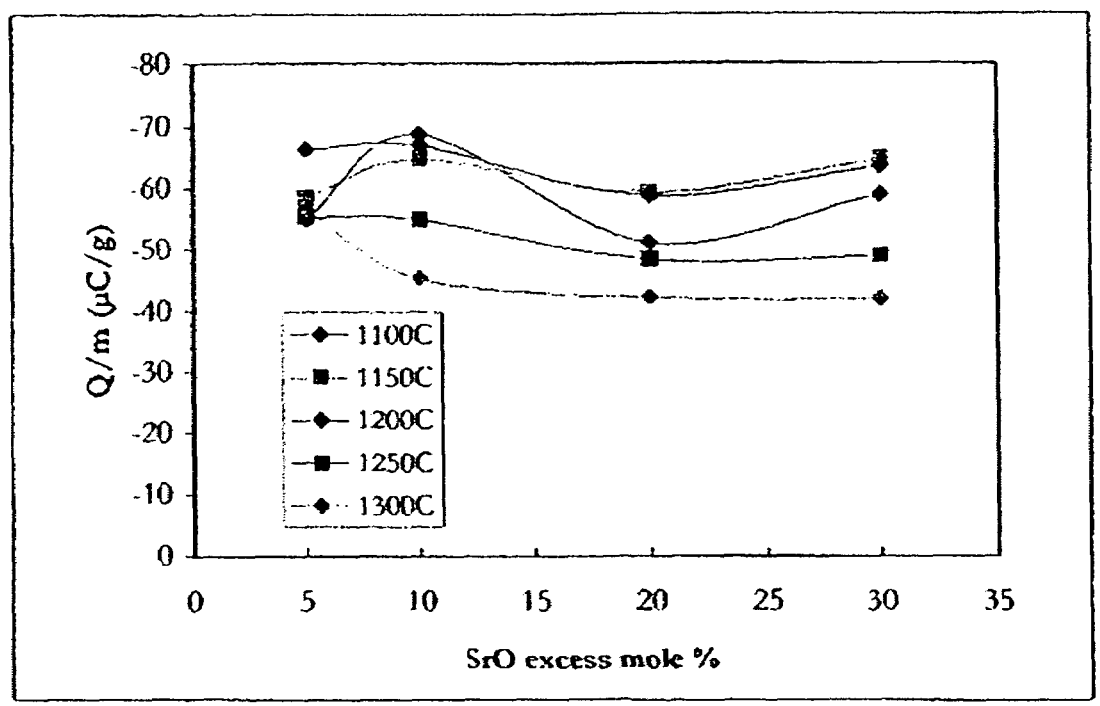
FIG. 4 is a graph showing Q/m values for control developer compositions (containing hard magnetic core particles having varying amounts of excess Sr but not containing $B_2O_3$) over a range of temperatures.
Figure 8:
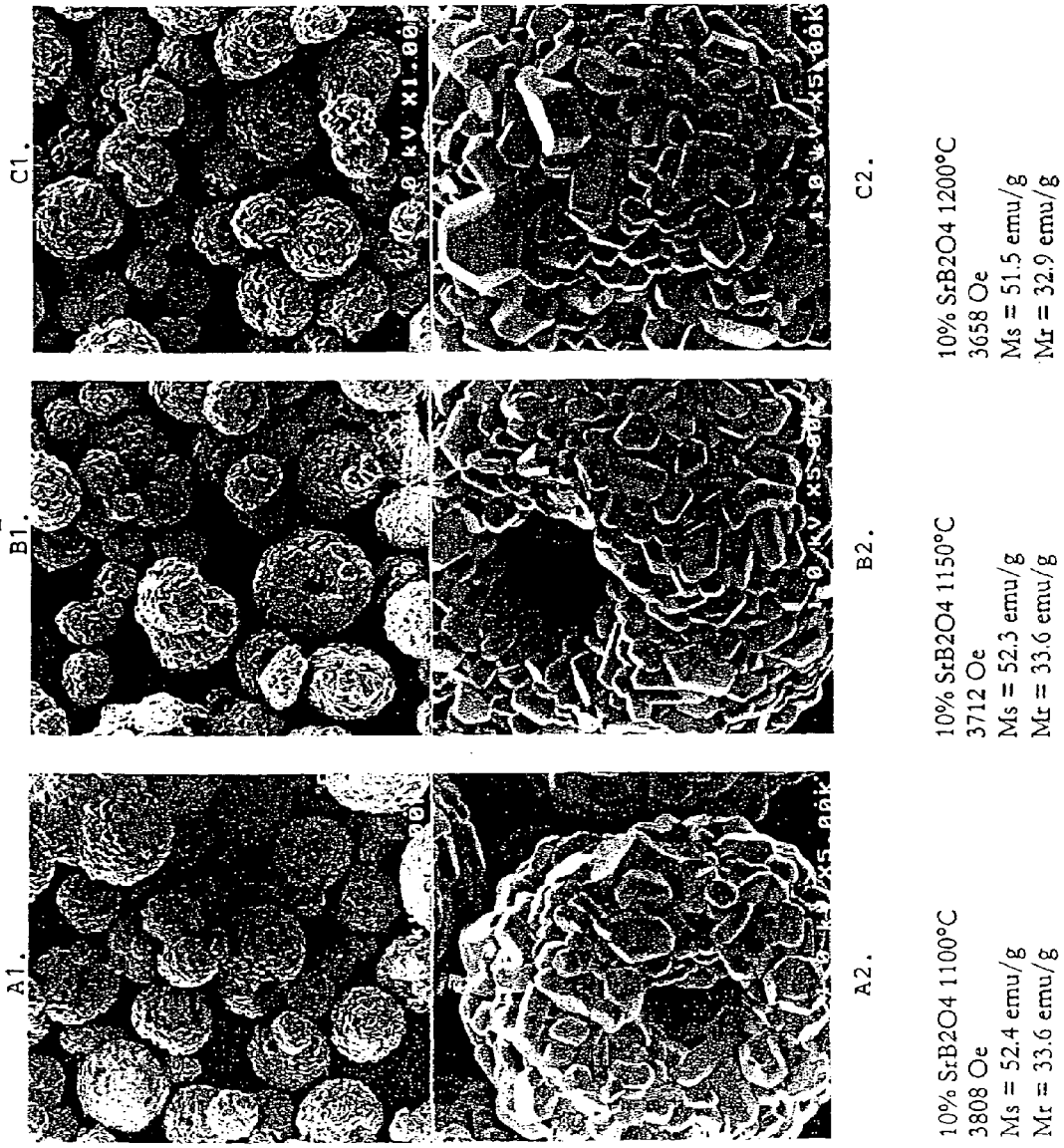
Figure 9:
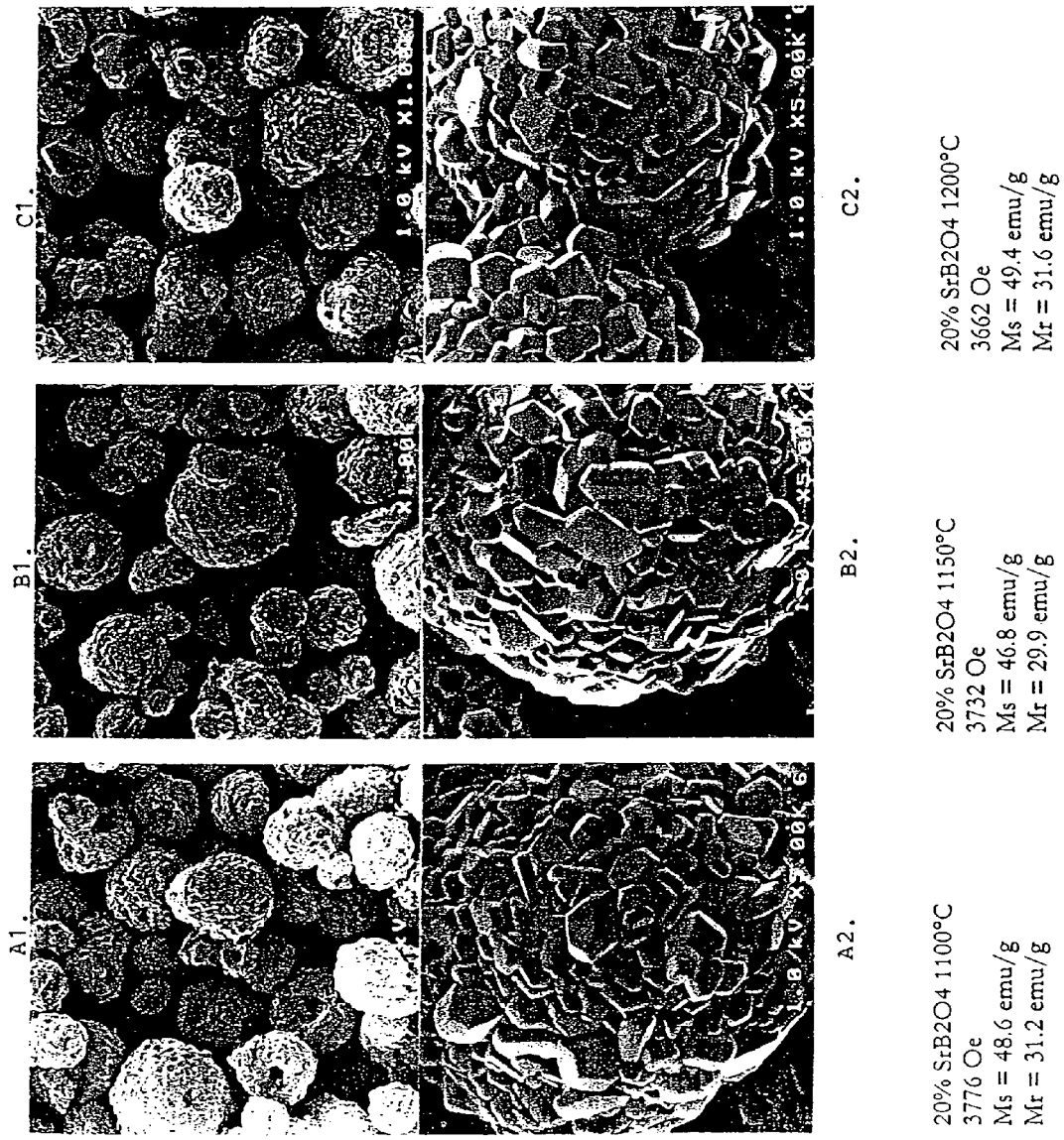
Figure 10:
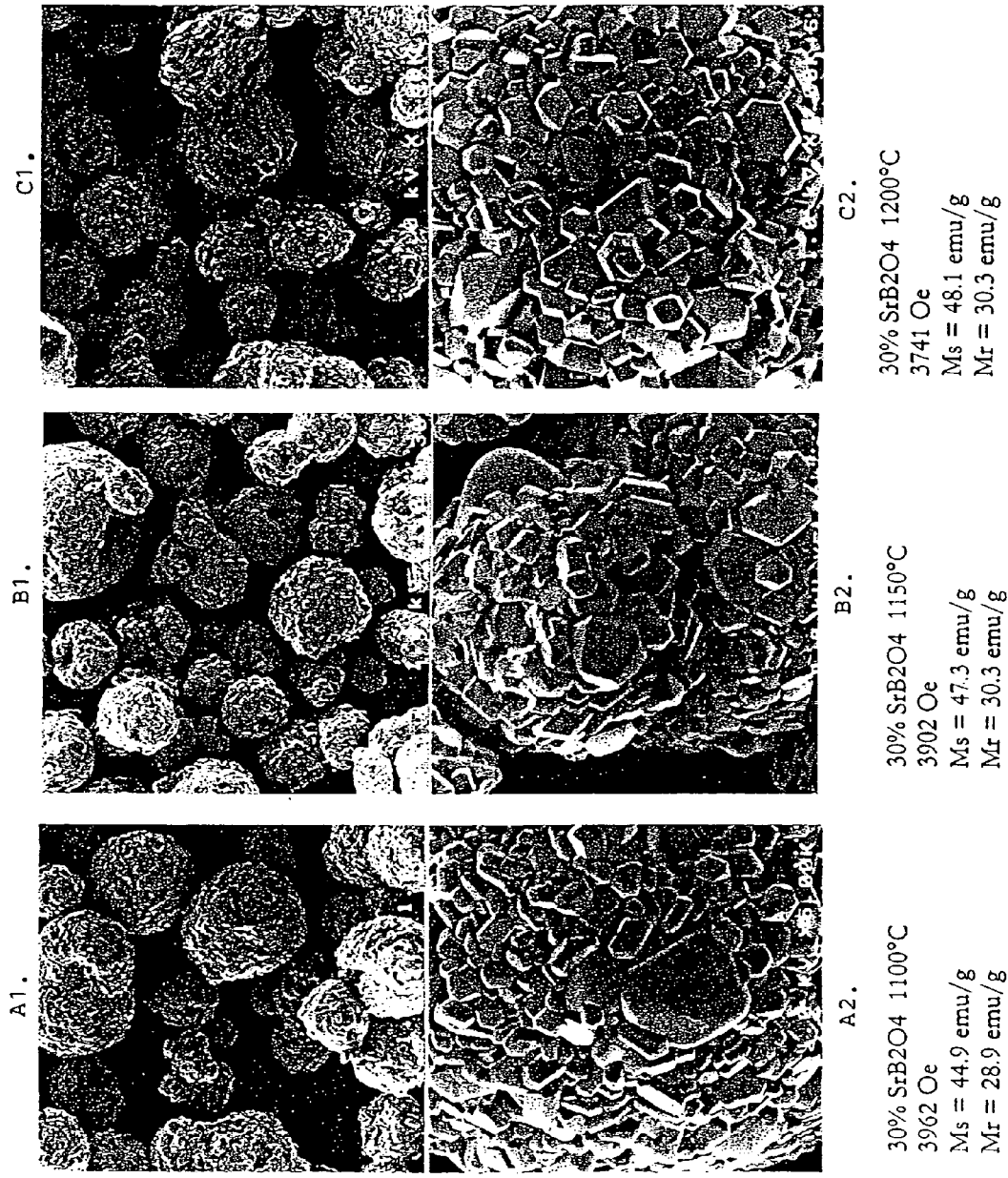
Figure 11:
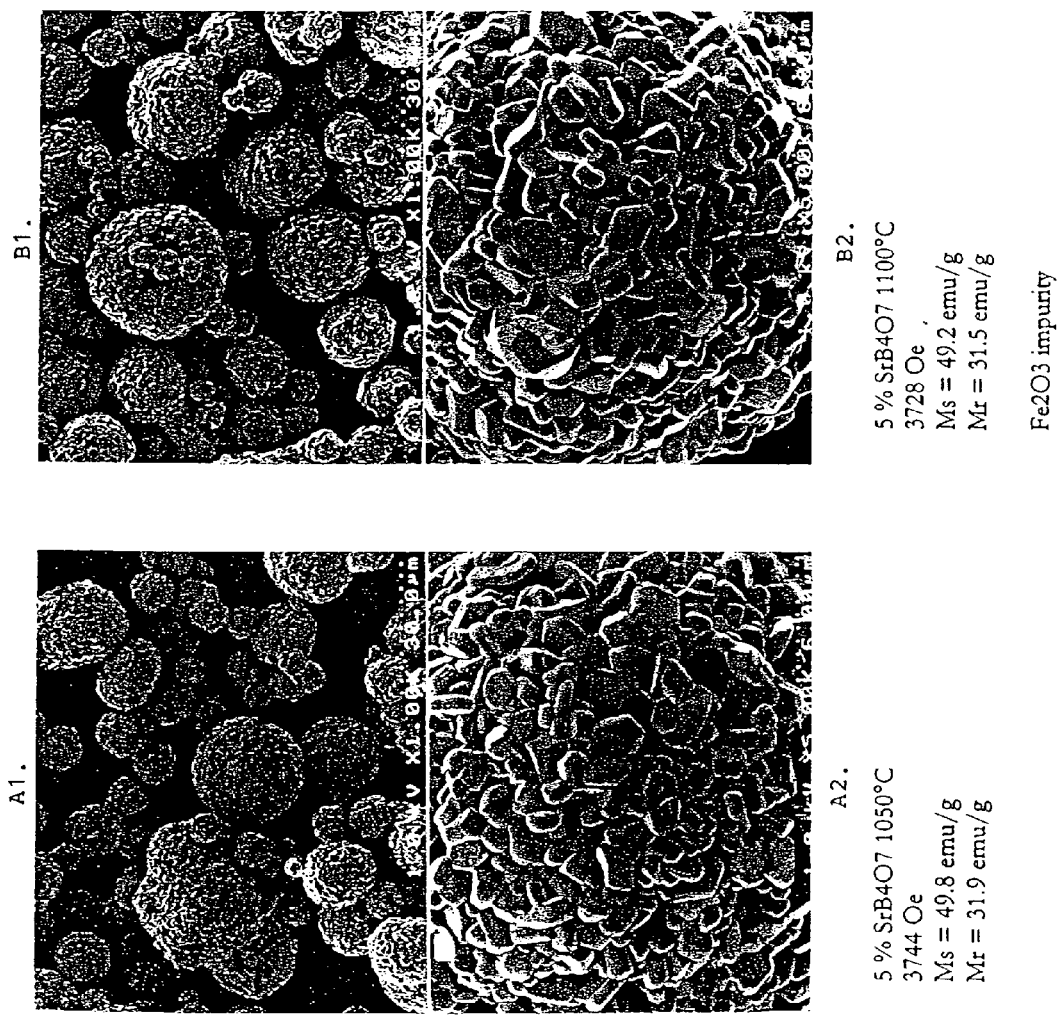
Figure 12:
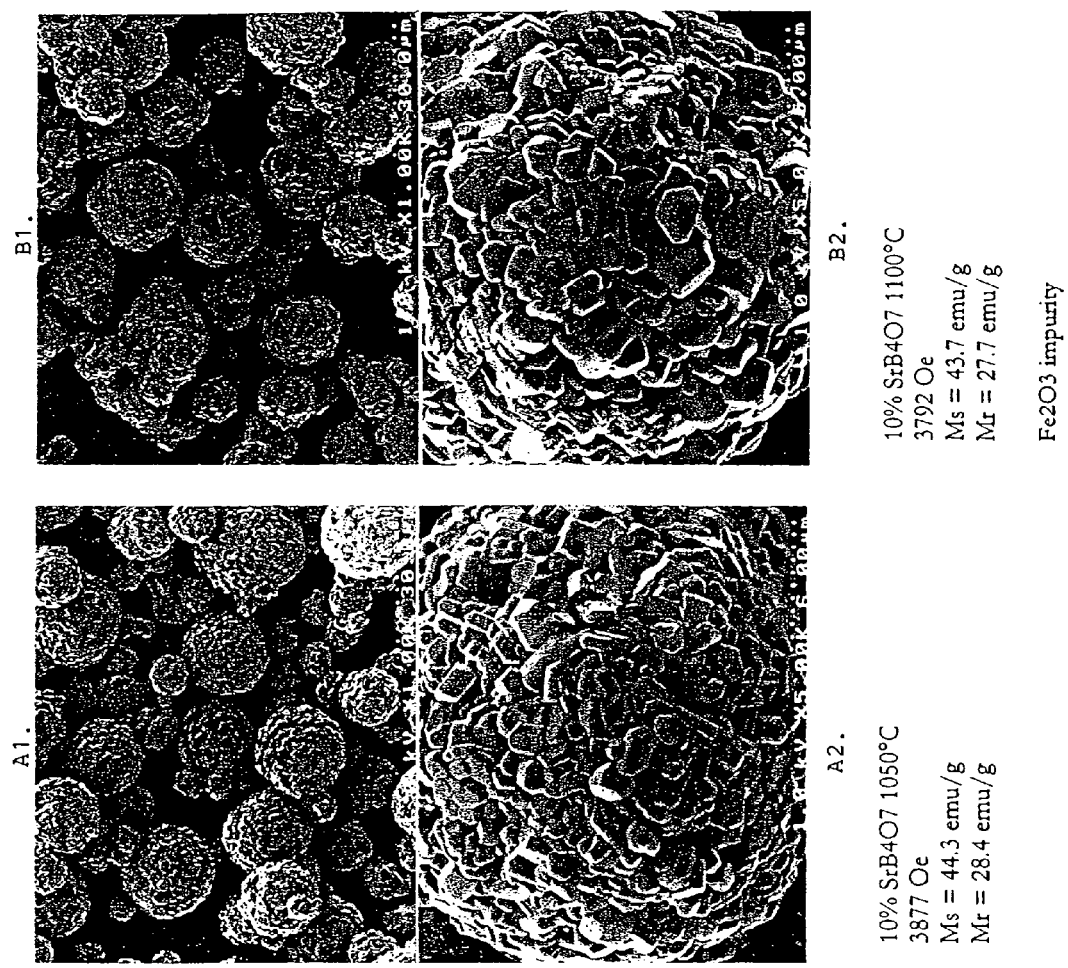
Figure 13:
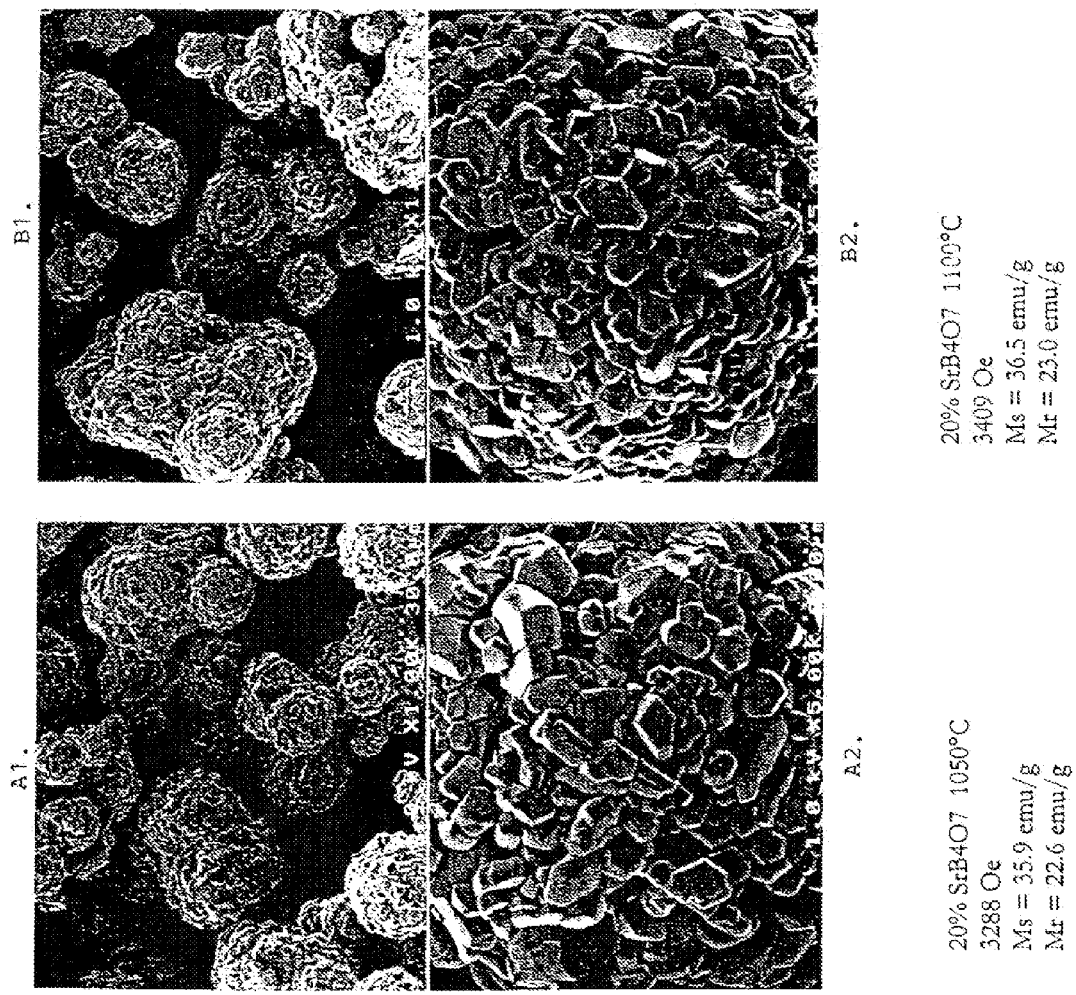
Figure 14:
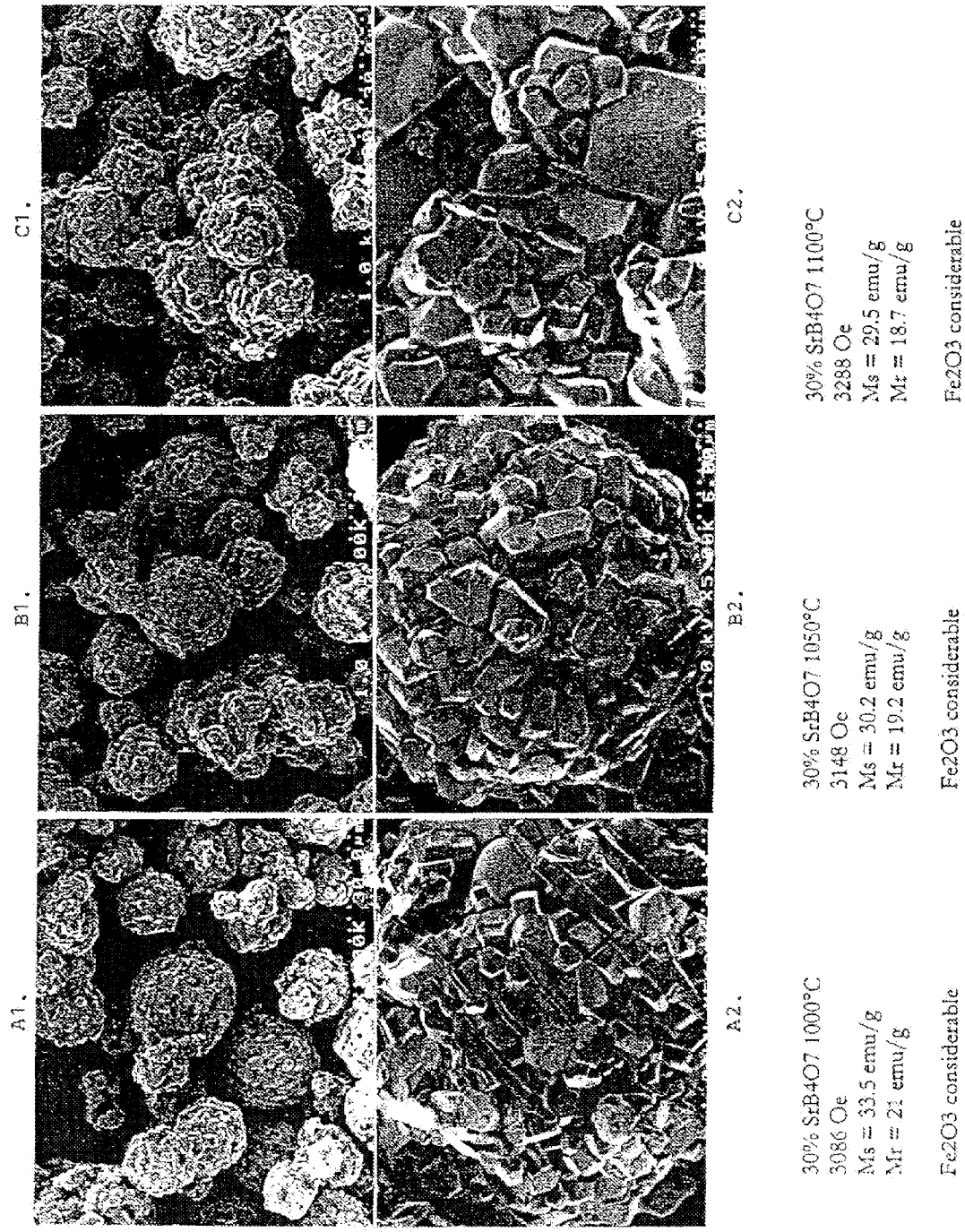

The difference in the $SrB_2O_4$ series and the $SrB_4O_7$ series versus the control series in terms of the variation of Q/m values over a range of temperature and composition variables may be readily seen by comparing FIG. 3 ($SrB_2O_4$ series and the $SrB_4O_7$ series) with FIG. 4 (control series).

To summarize, the above examples show that viable, well-densified particles can be obtained using a firing temperature of 100-200° C. below the firing temperature used with standard formulations. Cost and yield will be positively affected. The examples further show a major improvement in the robustness of coercivity to compositional and process conditions. This should improve product stability and Cpks. Developers should exhibit improvement in TC stability and partial magnetization of the core may be more reproducible. Developers and carriers may be less susceptible to demagnetization effects during coating and building.

Overall, the addition of borate produces triboelectrically stable species, with minimal Q/m variation with compositional and firing temperatures, particularly in the $SrB_2O_4$ compositions.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A method of forming hard magnetic core particles comprising:
    combining at least one ferric oxide, at least one strontium oxide precursor, at least one oxygenated boron compound, and at least one binder to form a mixture, wherein said strontium oxide precursor is present in an amount that provides SrO in a molar amount that is in excess of a stoichiometric amount that provides a ratio of $Fe_2O_3$ to SrO of 6/1,
    forming the mixture into green beads, and
    firing the green beads to form said hard magnetic core particles,
    wherein said mixture contains an amount of said strontium oxide precursor that provides about 5 to about 30 mole % excess of SrO and wherein said mixture contains said oxygenated boron compound in an amount that provides $B_2O_3$ in a molar amount equal to the about 5 to about 30 mole % excess of SrO or a molar amount that is twice the about 5 to about 30 mole % excess of SrO or a molar amount therebetween.

2. The method of claim 1, wherein said firing is at a temperature of less than 1150° C.

3. The method of claim 1, wherein said firing is at a temperature of from 1000 to 1150° C.

4. The method of claim 1, further comprising deagglomerating said hard magnetic core particles.

5. The method of claim 1, wherein said mixture contains an amount of said strontium oxide precursor that provides about 5 to about 20 mole % excess of SrO.

6. The method of claim 5, wherein said mixture contains said oxygenated boron compound in an amount tat provides $B_2O_3$ in a molar amount equal to about 5 to about 20 mole % excess of SrO or a molar amount that is twice said about 5 to about 20 mole % excess of SrO or a molar amount therebetween.

7. The method of claim 1, wherein the step of forming the mixture into green beads is accomplished by converting the mixture into a liquid slurry by ball milling, and then spray drying the liquid slurry to form the green beads.

8. The method of claim 1, further comprising combining the hard magnetic core particles with a toner to form a developer composition.

9. A composition comprising hard magnetic core particles made by the method of claim 2.

10. A composition comprising hard magnetic core particles made by the method of claim 3.

11. A composition comprising hard magnetic particles made by the method of claim 4.

12. A composition comprising hard magnetic core particles made by the method of claim 1.

13. A composition comprising hard magnetic core particles made by the method of claim 5.

14. A composition comprising hard magnetic core particles made by the method of claim 6.

15. A composition comprising hard magnetic core particles made by the method of claim 7.

16. A developer composition for electrophotography comprising toner particles and carrier particles wherein the carrier particles comprise a hard magnetic core particles made by the method of claim 1.

* * * * *